(12) United States Patent
Lyu et al.

(10) Patent No.: US 11,144,230 B2
(45) Date of Patent: Oct. 12, 2021

(54) DATA COPY AMOUNT REDUCTION IN DATA REPLICATION

(71) Applicant: International Business Machines Corporation, Armonk, NY (US)

(72) Inventors: Gang Lyu, Shanghai (CN); Bo Zou, Urumqi (CN); Yang Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/278,457

(22) Filed: Feb. 18, 2019

(65) Prior Publication Data

US 2020/0264796 A1    Aug. 20, 2020

(51) Int. Cl.
  *G06F 3/06* (2006.01)
  *G06N 7/00* (2006.01)
(52) U.S. Cl.
  CPC .......... *G06F 3/0647* (2013.01); *G06F 3/0604* (2013.01); *G06F 3/065* (2013.01); *G06F 3/0646* (2013.01); *G06F 3/0673* (2013.01); *G06N 7/005* (2013.01)
(58) Field of Classification Search
  CPC .... G06F 3/0647; G06F 3/0604; G06F 3/0673; G06F 3/064; G06F 3/065; G06F 3/0631; G06F 3/061; G06F 3/0656; G06N 7/005
  See application file for complete search history.

(56) References Cited

U.S. PATENT DOCUMENTS

| | | | |
|---|---|---|---|
| 7,848,183 B2 * | 12/2010 | Sasaki ................... | G11B 31/02 369/30.05 |
| 9,411,692 B2 | 8/2016 | Graefe et al. | |
| 9,471,245 B1 | 10/2016 | Shilane et al. | |
| 2003/0014534 A1 | 1/2003 | Watanabe et al. | |
| 2004/0181640 A1 | 9/2004 | Factor et al. | |
| 2007/0094530 A1 | 4/2007 | Kakizaki et al. | |
| 2013/0282967 A1 * | 10/2013 | Ramanujan ........... | G06F 3/0689 711/103 |
| 2017/0262520 A1 | 5/2017 | Doi | |
| 2018/0150335 A1 | 9/2018 | Mitkar et al. | |

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Reginald G Bragdon
*Assistant Examiner* — Thanh D Vo
(74) *Attorney, Agent, or Firm* — Nathan M. Rau

(57) ABSTRACT

Embodiments of the disclosure provide a computer-implemented method for data replication from a first storage to a second storage. In the method, data replication control blocks for data blocks stored in the first storage and needed to be transmitted may be generated. The data replication control blocks may be sorted in an ascending order of probabilities of expected overwrites of the respective data blocks. The data blocks may be transmitted from the first storage to the second storage according to the sorted data replication control blocks.

18 Claims, 9 Drawing Sheets

# DATA COPY AMOUNT REDUCTION IN DATA REPLICATION

BACKGROUND

Embodiments of the present disclosure relate to data processing, and more specifically, to data replication in a storage system.

A database can be stored in the storage system that has one or multiple storages. Examples of storages can include disk-based storages, integrated circuit storages, and so forth.

For example, the storage system comprises a primary storage that a computing device has access to for regular operations, and a secondary storage that the computing devices also have access to but generally used for backing up. For data protection or other purposes, it is important to make regular copies of data from a primary storage to a secondary storage. During the copy, the more times one data block is written, the more times it may need to be transmitted.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to an aspect of the present disclosure, there is provided a computer-implemented method for data replication from a first storage to a second storage. In this method, data replication control blocks for data blocks stored in the first storage and needed to be transmitted may be generated. The data replication control blocks may be sorted in an ascending order of probabilities of expected overwrites of the respective data blocks. Then, the data blocks may be transmitted from the first storage to the second storage according to the sorted data replication control blocks.

According to an aspect of the present disclosure, there is provided an apparatus for data replication from a first storage to a second storage. The apparatus may comprise one or more processors, a memory coupled to at least one of the processors, and a set of computer program instructions stored in the memory and executed by at least one of the processors in order to perform actions of, generating data replication control blocks for data blocks stored in the first storage and needed to be transmitted, sorting the data replication control blocks in an ascending order of probabilities of expected overwrites of the respective data blocks, and transmitting the data blocks from the first storage to the second storage according to the sorted data replication control blocks.

According to an aspect of the present disclosure, there is provided a computer program product for data replication from a first storage to a second storage. The computer program product may comprise a computer readable storage medium having program instructions embodied therewith, the program instructions executable by a processor to cause the processor to, generate data replication control blocks for data blocks stored in the first storage and needed to be transmitted, sort the data replication control blocks in an ascending order of probabilities of expected overwrites of the respective data blocks, and transmit the data blocks from the first storage to the second storage according to the sorted data replication control blocks.

In addition to the exemplary aspects and embodiments described above, further aspects and embodiments will become apparent by reference to the drawings and by study of the following descriptions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
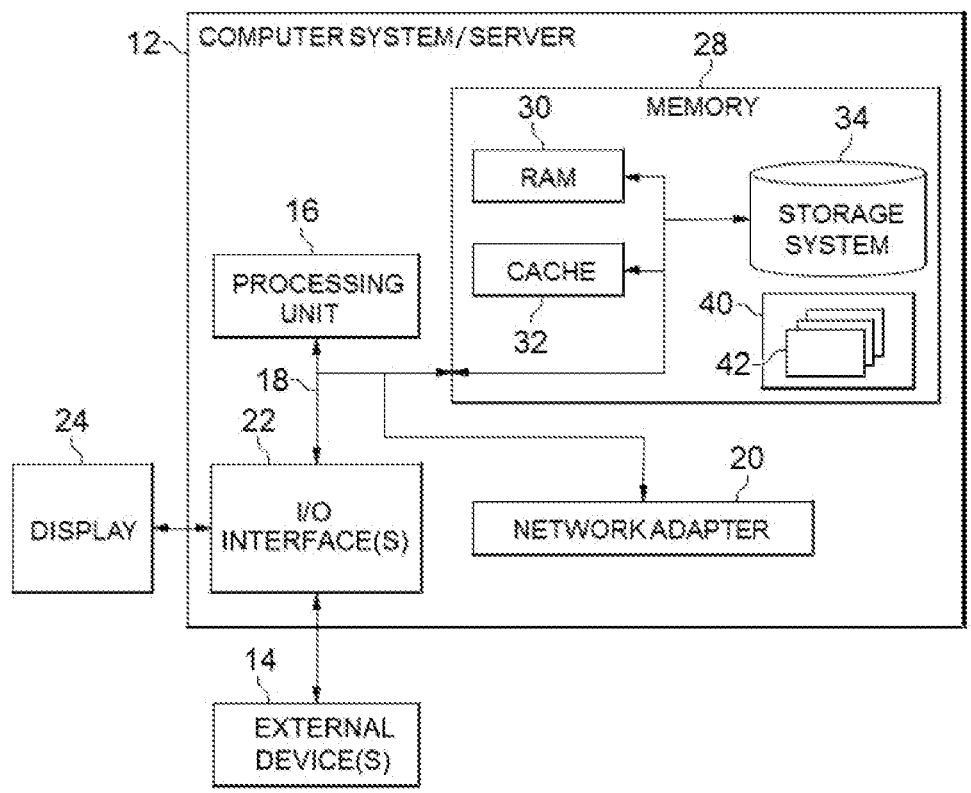
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
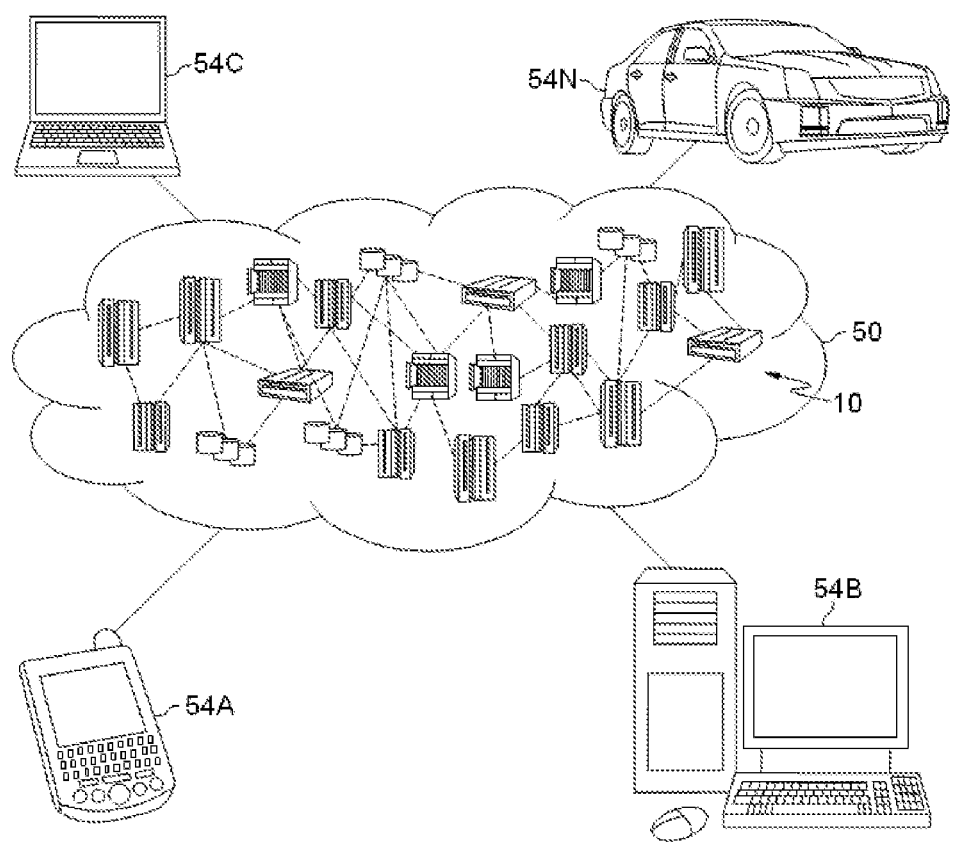
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
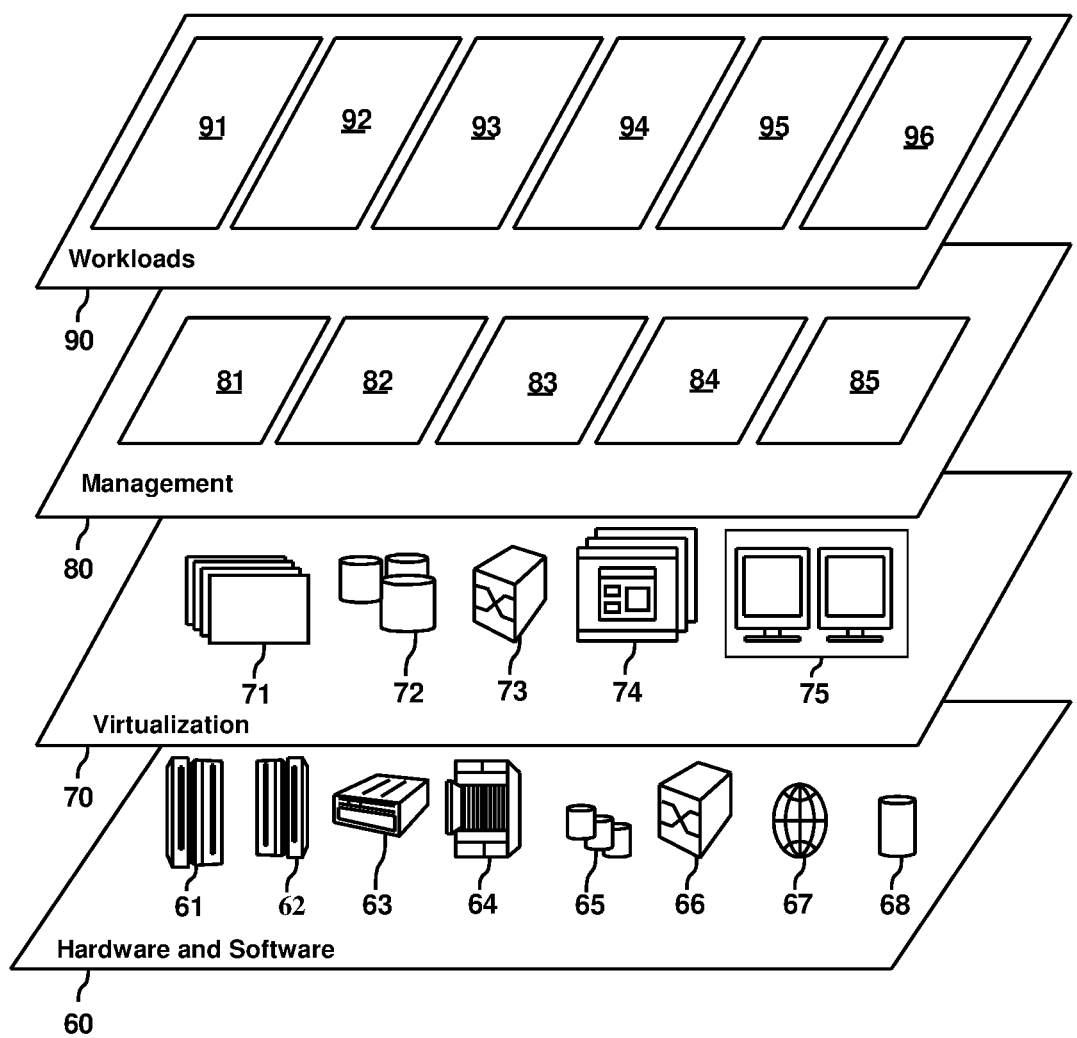
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data replication 96.

Generally, data replication can be implemented in a plurality of situations, for example, initial copy, data restoration/resynchronization, and normal data copy and the like. In some situations, an asynchronous data copy method is used and the sequence of written data is not guaranteed. Moreover, formation of a consistency group during the copy is not required.

The initial copy of synchronous remote mirror or asynchronous remote copy copies all of the data from the primary storage (also can be referred as a first storage) to the secondary storage (also can be referred as a second storage) for the initialization. During the initial copy, a computing device, such as a host, may still write commands to the primary storage. If a data block, such as a track, had been transmitted into the secondary storage and then is written again before the completion of initial copy, the written data block has to be transmitted again. Therefore, multiple transmissions of the same data block increase the total amount of copied data and thus prolong the time of the initial copy.

On the other hand, the synchronous remote mirror or asynchronous remote copy pair can be suspended due to a command or due to a condition that prevents further copying of data, such as loss of connectivity between the primary and secondary storages. After the suspension, the computing device can still write to primary storage and the data which has not been copied to secondary storage is recorded as out of synchronization data blocks. When such condition has been corrected, the copying of data is resumed under a resume command. The out of synchronization data blocks need to be transmitted to the secondary storage before the normal copy mode is resumed. Similar to the initial copy, the computing device may still write commands to the primary storage during the restoration/resynchronization.

When data loss happens for the primary storage (for example, a production site), the lost data needs to be restored (i.e. copied) from the secondary storage (for example, a recovery site). For example, the primary storage and the secondary storage can be swapped. After swapping, the secondary is converted to the primary storage (also can be referred as the first storage), and the primary storage is converted to the secondary storage (also can be referred as the second storage). In a case that the converted primary storage and converted secondary storage know their data difference, the out of synchronization data blocks are copied from the converted primary storage to the converted secondary storage. That is an incremental resynchronization. In another case that a bitmap recording the data difference has been corrupted, the whole storages are copied from the converted primary storage to the converted secondary storage. That is similar with the initial copy.

With respective to the normal data copy, the asynchronous remote copy without consistency group can be used for data migration, offsite backup, transmission of inactive database logs, and so on.

For the above situations, the computing device may write data to the primary storage (or converted primary storage) during transmission of data. Therefore, the total amount of the copied data may be increased and the copy time may be prolonged.

Figure 4:
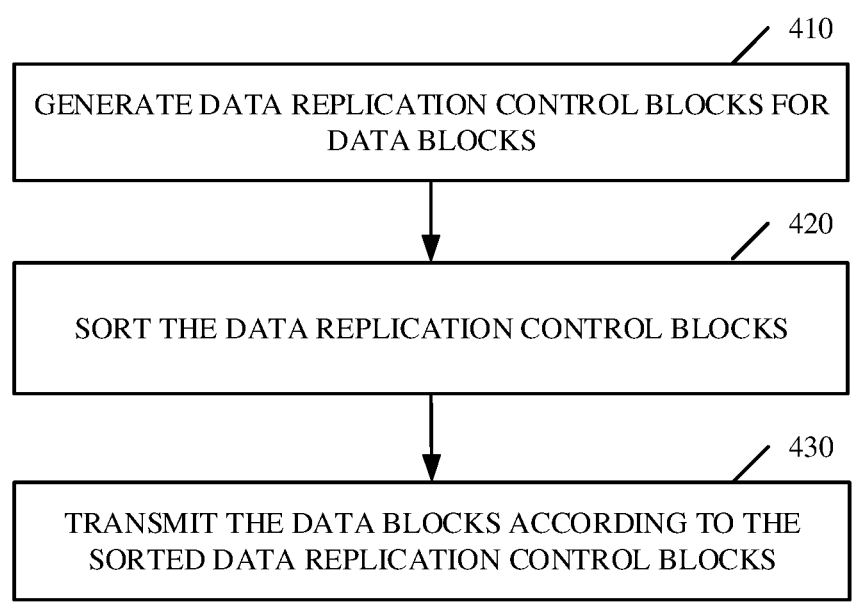
FIG. 4 depicts a schematic flowchart of the method for data replication according to an embodiment of the present disclosure.

With reference now to FIG. 4, it shows a schematic flowchart of the method for data replication from the first storage to the second storage according to an embodiment of the present disclosure. This method can be performed by a computing device, for example, the computer system/sever 12 shown in FIG. 1. The embodiment will be described in detail below in conjunction with the figures.

As shown in FIG. 4, at block 410, the computing device generates data replication control blocks (hereinafter also referred to as DRCBs) for data blocks which are stored in the first storage and needed to be transmitted. The data replication control block may be a descriptor structure of the data block. Thus, the data replication control block identifies the corresponding data block.

In an embodiment, the storage system comprises the first storage (for example, the primary storage or the converted primary storage as described above) and the second storage (for example, the secondary storage or the converted secondary storage as described above). The first storage stores all of the data blocks, comprising the data blocks that has been synchronized and the data blocks that has not been synchronized.

The synchronization states of the respective data blocks stored in the first storage can be recorded by a synchronization bitmap. For example, bit 1 in the synchronization bitmap indicates that the corresponding data block has not been synchronized and needs to be transmitted to the second storage, and bit 0 in the synchronization bitmap indicates that the data block has already been synchronized and does not need to be transmitted.

For example, in the initial copy, all bits of the synchronization bitmap may be initialized to 1, which indicates all of the data should be synchronized. After one data block has been copied from the first storage to the second storage, the corresponding bit is changed from 1 to 0. In response to a written operation of a data block, the data block needs to be transmitted from the first storage to the second storage, and the corresponding bit is changed to 1.

Then at block 420, the computing device sorts the data replication control blocks in an ascending order of probabilities of expected overwrites of the respective data blocks.

In an embodiment, the first storage can be mapped into Redundant Arrays of Independent Drives (RAID) arrays in the backend. The computing device may create several queues in each RAID array. The respective queue can be realized by a linked list containing the data replication control blocks for the data blocks. A node of the linked list is composed of the data replication control block for one data block which needs to be transmitted to the second storage. A cache data structure, such as Cache Directory Control Block (i.e. CDCB), of the data block may comprise a pointer pointing to the corresponding data replication control block of linked list. For example, the pointer can be moved from head to tail in the linked list. The linked list may be changed dynamically according to the change of the synchronization states of the data blocks. Furthermore, it is also applicable to the queues setting by volume level, device adapter level, extent pool level, system level, etc., besides RAID array level.

The process of block 420 can be described in several embodiments in conjunction with the following figures.

Figure 5:
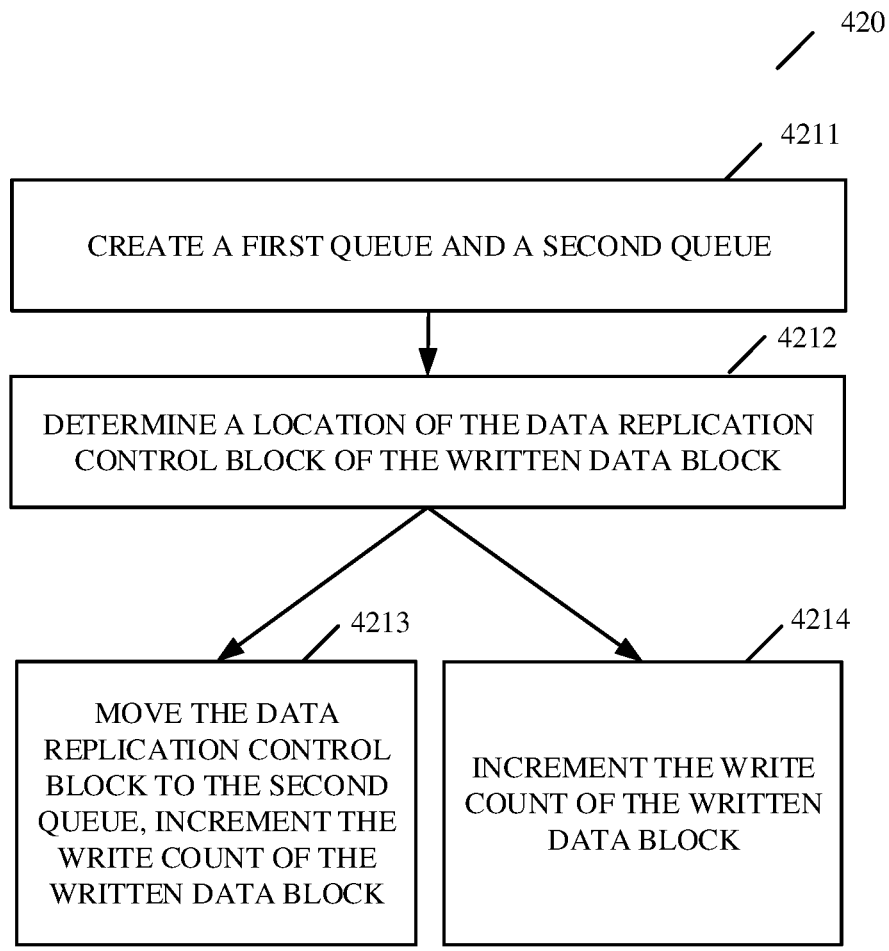
FIG. 5 shows a schematic process of sorting the data replication control blocks according to an embodiment of the present disclosure.

FIG. 5 shows a schematic process of sorting the data replication control blocks in an ascending order of probabilities of expected overwrites of the respective data blocks according to an embodiment of the present disclosure.

As FIG. 5 shows, at block 4211, the computing device may create a first queue and a second queue. The first queue may hold the data replication control blocks for the data blocks which are stored in the first storage and needed to be transmitted. In an embodiment, the first queue may be initialized according to the synchronization bitmap. For example, each node of the first queue is composed of the corresponding data replication control block to bit 1 in the synchronization bitmap. Moreover, the second queue may be initialized as a null linked list.

The computing device may acquire write heat or write frequency of the respective data blocks according to storage tiering technology. The write heat or write frequency may indicate the probability of expected data block overwrite. Then, the computing device may sort the data replication control blocks in the first queue in an ascending order of the write heats or the write frequencies of the respective data blocks. Thus, the data block that is colder or with a lower frequency is sorted before the data block that is hotter or with a higher frequency. Otherwise, the computing device may also sort the data replication control blocks in the first queue in other methods, for example, an ascending order of addresses of the data blocks.

Then at block 4212, if there is a write operation to a data block, the computing device may determine a location of the data replication control block for the written data block.

In an aspect, if it is determined that the data replication control block of the written data block is in the first queue, the process proceeds to block 4213. At block 4213, the computing device may move the data replication control block of the written data block to the second queue, for example, to the tail of the second queue, and increment a write count of the written data block. The write count of the corresponding data block may also indicate the probability of expected overwrite of the data block.

In another aspect, if it is determined that the data replication control block of the written data block is in the second queue, the process proceeds to block 4214. At block 4214, the computing device may only increment the write count of the written data block without change the location of the data replication control block.

In this case, the first queue holds the data blocks that have not been written, while the second queue holds the data blocks that have been written for at least once. The write count can be recorded by a counter for the corresponding data block. As an example, the write count of the written data block can be incremented by increasing the corresponding counter by 1.

Figure 6:
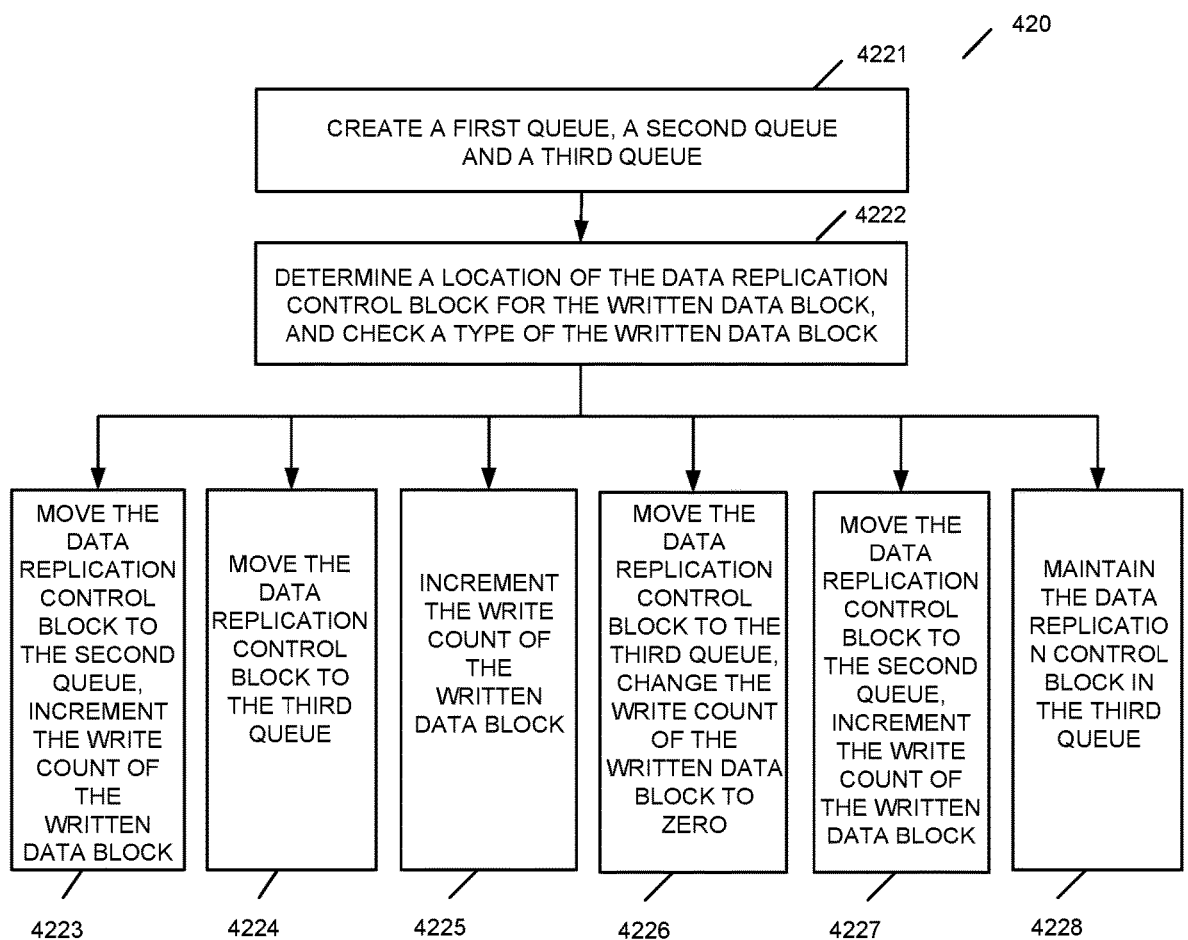
FIG. 6 shows a schematic process of sorting the data replication control blocks according to another embodiment of the present disclosure.

On the other side, the process of block 420 can be performed in other manner FIG. 6 shows a schematic process of sorting the data replication control blocks in an ascending order of probabilities of expected overwrites of the respective data blocks according to another embodiment of the present disclosure.

As FIG. 6 shows, at block 4221, the computing device may create the first queue, the second queue and a third queue.

Then at block 4222, in response to the write operation to the data block, the computing device may not only determine the location of the data replication control block for the written data block, but also check a type of the written data block, such as a random data block or a sequential data block. Generally, the sequential data blocks are written for one time and may not be overwritten in a short time period. Thus, the sequential data blocks are colder data blocks compared with the random data blocks.

If it is determined that the data replication control block of the written data block is in the first queue and the written data block is a random data block, the process proceeds to block 4223. At block 4223, the computing device may move the data replication control block of the written data block to the second queue, and increment the write count of the written data block.

If it is determined that the data replication control block of the written data block is in the first queue and the written data block is a sequential data block, the process proceeds to block 4224. At block 4224, the computing device may move the data replication control block of the written data block to the third queue, for example, to the tail of the third queue.

If it is determined that the data replication control block of the written data block is in the second queue and the written data block is a random data block, the process proceeds to block 4225. At block 4225, the computing device may increment the write count of the written data block without changing the location of the data replication control block.

If it is determined that the data replication control block of the written data block is in the second queue and the written data block is a sequential data block, the process proceeds to block 4226. At block 4226, the computing device may move the data replication control block of the written data block to the third queue, and change the write count of the corresponding written data block to 0.

If it is determined that the data replication control block of the written data block is in the third queue and the written data block is a random data block, the process proceeds to block 4227. At block 4227, the computing device may move the data replication control block of the written data block to the second queue, and increment the write count of the written data block.

Otherwise, if it is determined that the data replication control block of the written data block is in the third queue and the written data block is a sequential data block, the process proceeds to block 4228. At block 4228, the computing device may maintain the data replication control block of the written data block in the third queue.

Therefore, the first queue may hold the cold and random data blocks, the second queue may hold the hot and random data blocks, and the third queue may hold the sequential data blocks. Thus, the sequential data blocks have lower probabilities of expected data overwrites, compared with the random data blocks with higher probabilities.

Figure 7:
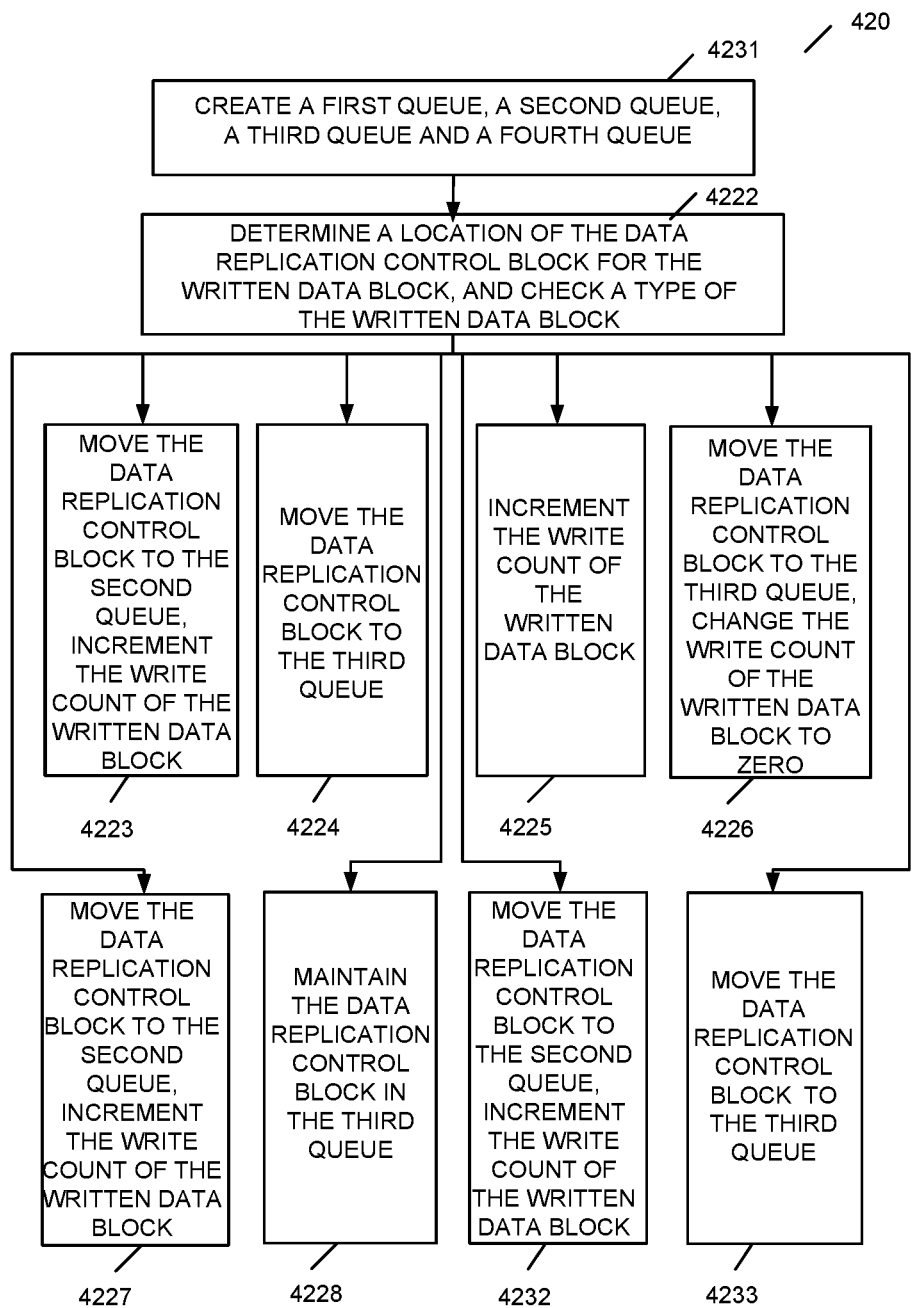
FIG. 7 shows a schematic process of sorting the data replication control blocks according to yet another embodiment of the present disclosure.

Moreover, FIG. 7 shows a schematic process of sorting the data replication control blocks in an ascending order of probabilities of expected overwrites of the respective data blocks according to yet another embodiment of the present disclosure.

As FIG. 7 shows, at block 4231, the computing device may also create a fourth queue, besides the first queue, the second queue, and the third queue. The fourth queue may hold the data replication control blocks that are not in the first queue, the second queue, or the third queue. As an example, the fourth queue may hold the data replication control blocks for the data blocks which have already been synchronized.

As described above, at block 4222, if a data block is written, the computing device may determine the location of the data replication control block of the written data block, and check the type of the written data block.

Blocks 4223 to 4228 have been described as above, and will be omitted here.

In addition, if it is determined that the data replication control block of the written data block is in the fourth queue and the written data block is a random data block, the process proceeds to block 4232. At block 4232, the computing device may move the data replication control block of the written data block to the second queue, and increment the write count of the written data block.

Moreover, if it is determined that the data replication control block of the written data block is in the fourth queue and the written data block is a sequential data block, the process proceeds to block 4233. At block 4233, the computing device may move the data replication control block of the written data block to the third queue.

After the sorting process, back to FIG. 4, at block 430, the computing device transmits the data blocks from the first storage to the second storage according to the sorted data replication control block.

In an embodiment, the computing device may transmit the data blocks according to the sorting of the data replication control blocks in the first queue. As an example, the computing device may transmit the data blocks according to the data replication control blocks pointed by the pointer in the first queue. The pointer can be moved from head to tail in the first queue. As described above, the data blocks may be transmitted according to the ascending order of the write heats or write frequencies. or the addresses of the data blocks.

After transmitting the data blocks, the computing device may remove the data replication control blocks of the transmitted data blocks from the first queue. Moreover, the computing device may change the corresponding bits in the synchronization bitmap to 0, and move the pointer to the next data replication control block in the first queue.

With the transmission of the data blocks, the computing device may further determine an amount of the data replication control blocks in the first queue. If the amount of the data replication control blocks in the first queue is below a threshold, the computing device may sort the data replication control blocks in the second queue in an ascending order of the write counts of the corresponding data blocks.

Furthermore, if the amount of the data replication control block in the first queue is 0, the computing device may determine whether an amount of the data replication control block in the second queue is 0. If not, the computing device may convert the second queue into the first queue, and change the write counts of the data blocks in the converted first queue to 0. Moreover, the computing device may create a new second queue, which may be initialized as null linked list. Then, the hot random data blocks may be moved to the new second queue in response to the written operation as described above.

On the other hand, the computing device may transmit the data blocks according to the data replication control blocks pointed by the pointer in the third queue. After transmitting the data blocks, the computing device may change the corresponding bits in the synchronization bitmap to 0, remove the data replication control block of the transmitted data block from the third queue, and move the pointer to the next data replication control block in the third queue.

Moreover, the data replication control block of the transmitted data block may be moved to the fourth queue.

In some embodiments, the computing device may transmit the data blocks according to the data replication control blocks in the third queue in a first transfer rate, and transmit the data blocks according to the data replication control blocks in the first queue in a second transfer rate. After the transmission of the data blocks, the computing device may remove the data replication control blocks of the transmitted data blocks from the corresponding queues. For example, the data replication control block of the transmitted data block in the first queue and the third queue may be moved to the fourth queue.

Compared with the random data blocks, the sequential data blocks have less chance to be overwritten in a period of time. Therefore, the second queue can be configured to delay the transmission of the hot random data blocks, while the sequential data blocks only need the third queue to expedite the transmission. Correspondingly, compared with the first queue, the third queue may keep a higher transfer rate. Then the first transfer rate for the third queue may be configured to be higher than the second transfer rate for the first queue.

In an embodiment, the computing device may determine the first and second transfer rates depending on a fixed ratio between the first and second transfer rates, for example, 5:1 or 10:1. Moreover, the computing device may also dynamically adjust the first and second transfer rates based on a length ratio of the first queue and the third queue. The length is corresponding to the amount of the data replication control blocks in the respective queue. In addition, the computing device may also dynamically adjust the first and second transfer rates according to an incoming data rate ratio of the second queue and the third queue. For example, the incoming data rate is a frequency for moving the data replication control blocks into the respective queues.

Furthermore, the computing device may allocate different amount of resources to the first queue and the third queue according to the first and second transfer rate. For example, the queue with higher transfer rate may be allocated with more ports. Otherwise, the computing device may also assign different priorities to the first queue and the third queue according to the first and second transfer rate. For example, the queue with higher transfer rate may be assigned with higher priority.

It can be therefore seen from the above description that the computing device may transmit the data blocks from the first storage to the second storage based on the ascending order of the probabilities of the expected overwrites of the data blocks. In this way, the total amount of the copied data is decreased and the copy time is reduced. Thus, the data replication speed is improved.

Figure 8A:
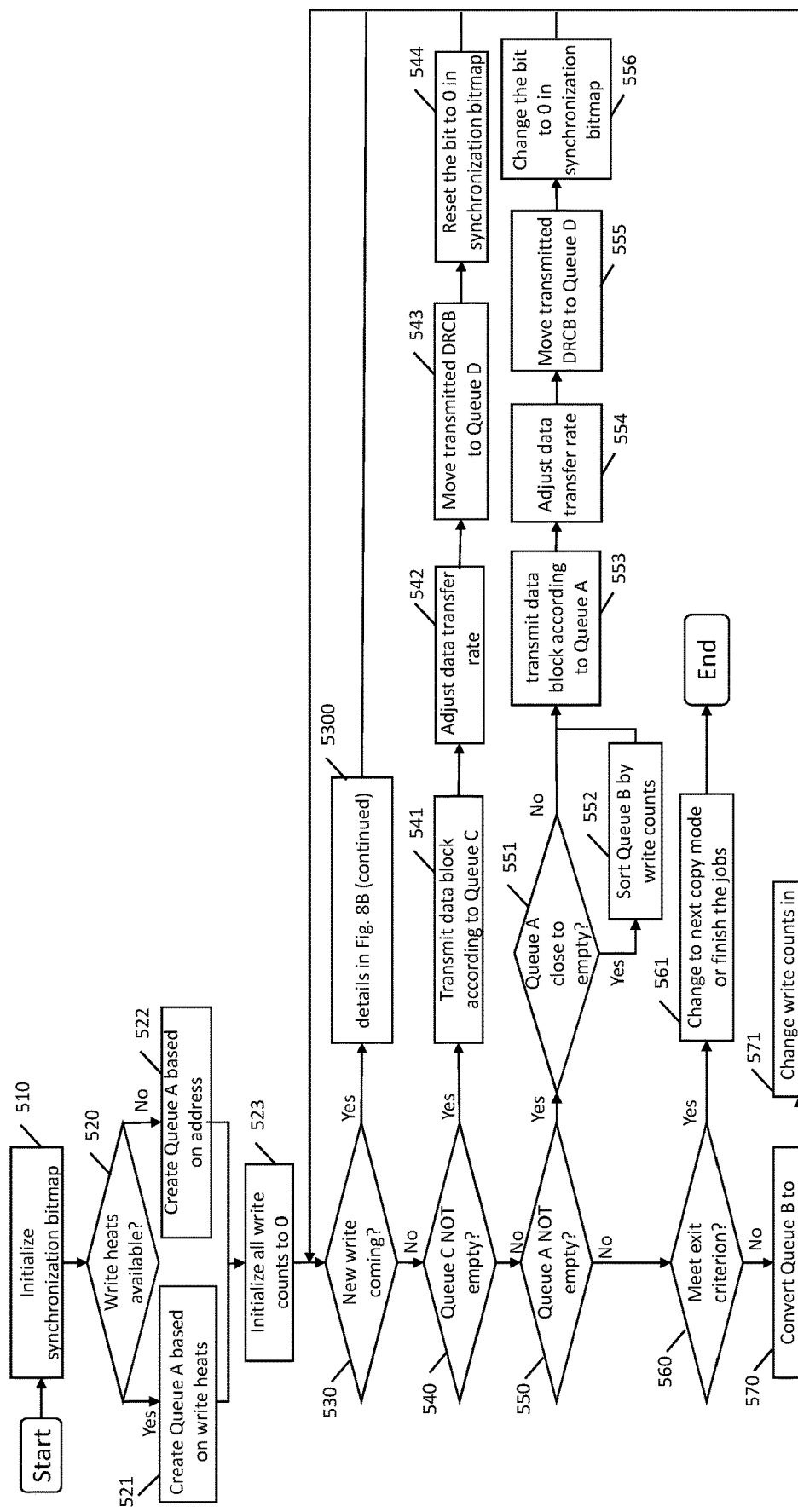
FIG. 8A and FIG. 8B depict a schematic flowchart illustrating an example for data replication according to an embodiment of the present disclosure.
Figure 8B:
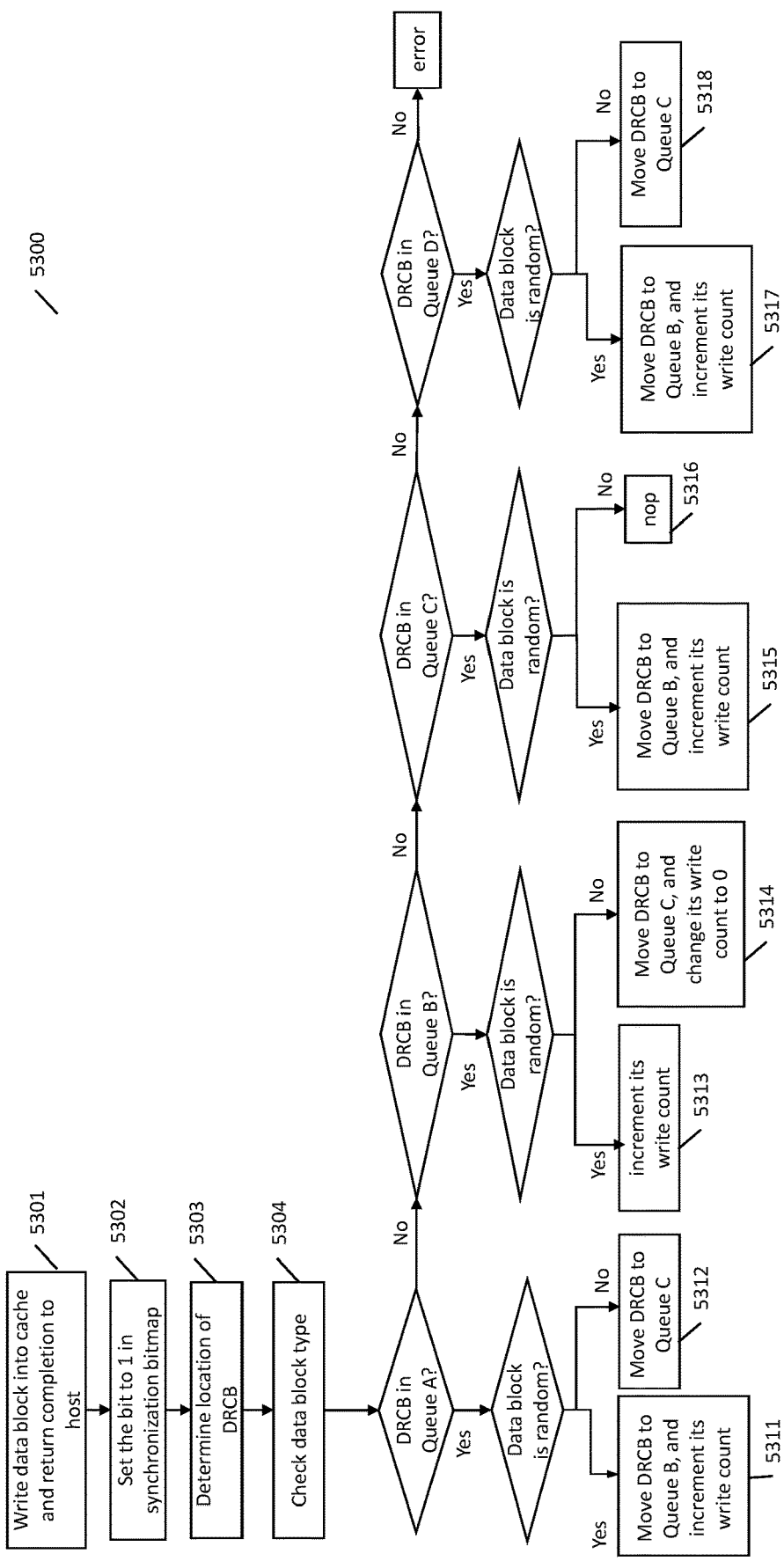

FIG. 8A and FIG. 8B show a schematic flowchart illustrating an example of method for data replication according to an embodiment of the disclosure. FIGS. 8A and 8B will be discussed together. This method can be performed by a computing device, for example, the computer system/sever 12 shown in FIG. 1. The embodiment will be described in detail below in conjunction with the figures.

As shown in FIG. 8, at block 510, the computing device may generate the synchronization bitmap for the data blocks, such as tracks. This method is also applicable to other sizes of data blocks besides track. All bits in the bitmap are initialized to 0.

At block 520, the computing device may check whether the write heats of the data blocks are available in the cache. If the write heats are available, it processes to block 521. At block 521, the computing device may create Queue A that may hold the DRCBs for data blocks stored in the first storage and needed to be transmitted. The computing device may sort the DRCBs in Queue A according to the ascending order of the write heats. Otherwise, if the write heats are not available, it processes to block 522. At block 522, the computing device may create Queue A, where the DRCBs in Queue A may be sorted according to other methods, like the address of the data blocks. Moreover, the computing device may also create Queue B, Queue C, and Queue D at both block 521 and block 522. After that, at block 523, the computing device may initialize the write counter of each data block to 0.

At block 530, the computing device may check whether there is a new command written by the host. For example, the computing device may check whether there is a write operation to a data block. If so, it processes to block 5300, which comprises the following blocks illustrated in FIG. 8B.

At block 5301, the computing device may update the corresponding data block and return a completion acknowledgement to the host. At block 5302, the computing device may set the corresponding bit in the bitmap to 1. Then, at block 5303, the computing device may determine the location of the DRCB of the written data block, for example, whether the DRCB of the written data block is located in Queue A, Queue B, Queue C or Queue D. Moreover, at block 5304, the computing device may check the type of the written data block, for example, a random data block or a sequential data block, from the cache.

If the DRCB of the written data block is located in Queue A and the written data block is a random data block, it processes to block 5311. At block 5311, the computing device may move the DRCB of the written data block to the tail of Queue B, and increase the write counter of the written data block. In this situation, the update of the data block indicates that the data block currently becomes hot and may be written more times and thus needs to be moved into Queue B to delay the data transmission.

If the DRCB of the written data block is located in Queue A and the written data block is a sequential data block, it processes to block 5312. At block 5312, the computing device may move the DRCB of the written data block to the tail of Queue C.

If the DRCB of the written data block is located in the hot random Queue B and the written data block is a random data block, it processes to block 5313. At block 5313, the computing device may increase the write counter of the written data block. In this situation, the update to the data block in Queue B does not lead to the movement of the DRCBs to prevent excessive node pointer operations.

If the DRCB of the written data block is located in the hot random Queue B and the written data block is a sequential data block, it processes to block 5314. At block 5314, the computing device may move the DRCB of the written data block to the tail of Queue C. The reason that the data block in the random Queue B is determined as a sequential data block may be caused by different access mode. This situation seldom happens.

If the DRCB of the written data block is located in Queue C and the written data block is a random data block, it processes to block 5315. At block 5315, the computing device may move the DRCB of the written data block to the tail of Queue B, and increase the write counter of the written data block. Similarly, the data block may be determined as two types due to different access mode. This situation seldom happens.

If the DRCB of the written data block is located in Queue C and the written data block is a sequential data block, it processes to block 5316. At block 5316, the computing device may maintain the DRCB of the written data block in Queue C. That is, no movement is required. Since the sequential data block is less expected to be written in a period, this situation seldom happens.

If the DRCB of the written data block is located in Queue D and the written data block is a random data block, it processes to block 5317. At block 5317, the computing device may move the DRCB of the written data block to the tail of Queue B, and increase the write counter of the written data block.

If the DRCB of the written data block is located in Queue D and the written data block is a sequential data block, it processes to block 5318. At block 5318, the computing device may move the DRCB of the written data block to the tail of Queue C.

It is to be noted that, the sequential of the block 5303 and 5304 is not limited herein. The computing device may check the type of the data block first and then determine the location of the DRCBs as well. Otherwise, the computing device may do both at the same time.

Otherwise, if the written data block is not located in any of Queue A, Queue B, Queue C and Queue D, the computing system may transmit a notification indicating the error.

After processing the block 5300 in response to the write operation to the data block, the computing device perform the block 530 (FIG. 8A) in response to the write operation to the next data block.

Then, it processes to block 540. At block 540, the computing device may determine whether Queue C is empty, for example, whether the amount of the DRCBs in Queue C is 0.

If Queue C is not empty, the computing device may transmit the data block pointed by the pointer of Queue C, at block 541. Then at block 542, the computing device may adjust the transfer rate of Queue C. At block 543, the computing device may move the DRCB of the transmitted data block into Queue D and move the pointer to the next DRCB in Queue C. Moreover, at block 544, the computing device may set the corresponding bit in the synchronization bitmap to 0.

Moreover, at block 550, the computing device may determine whether Queue A is empty, for example, whether the amount of the DRCBs in Queue A is 0.

In an embodiment, the acknowledgement of the enroute data block from the second storage is not required to be received before starting to move the pointer and transmit the next data block. It can ensure parallelization of the transmission to make use of capability of bandwidth of the storage system and paths or links. If the acknowledgement of one data block is not received after a timeout threshold, the computing device may re-transmit the data block.

If Queue A is not empty, the computing device may determine whether the amount of the DRCBs is close to empty, at block 551. For example, the computing device may determine whether the amount of the DRCBs in Queue A is below a threshold. If so, at block 552, the computing device may sort the DRCBs in Queue B in an ascending order of the write count of the corresponding data blocks recorded by the write counter. Otherwise, at block 553, the computing device may transmit the data block pointed by the head pointer of Queue A.

Then at block 554, the computing device may adjust the transfer rate of Queue A. For example, the transfer rate of Queue A can be adjusted to a lower transfer rate, compared with the transfer rate of Queue C. Then at block 555, the computing device may move the DRCB of the transmitted data block into Queue D and move the pointer to the next DRCB. Moreover, the computing device may set the corresponding bit in the synchronization bitmap to 0.

In an embodiment, the acknowledgement of the enroute data block from the second storage is not required to be received before starting to move the pointer and transmit the next data block. It can ensure parallelization of the transmission to make use of capability of bandwidth of the storage system and paths or links. If the acknowledgement of one data block is not received after a timeout threshold, the computing device may re-transmit the data block.

It is to be noted that the sequential for performing the respective blocks are not limited herein. For example, the write of host, data transmission for queue C and data transmission for queue A can be realized by 3 independent processes or threads and can work in parallel or simultaneously.

On the other side, if the computing device determines Queue A is empty, it further determines whether exit criterion is met at block 560. For example, the computing device may determine whether there are DRCBs in Queue B. If there is no DRCB in Queue B, the exit criterion is met, otherwise it is not met. In response to meeting the exit criterion, at block 561, the computing device may change the data replication mode to a next replication mode or finish the data replication job. Therefore, the data replication process ends.

Furthermore, if the exit criterion is not met, at block 570, the computing device may convert Queue B into Queue A, and create a new Queue B. Then, at block 571, the computing device may change the write counts of data blocks corresponding to the DRCBs in the new Queue A to 0.

Otherwise, after processing the block 544, 556 and 571, the computing device may process from the block 530 until the data replication process ends.

Under the same inventive concept, another embodiment of the invention can provide an apparatus for data replication from a first storage to a second storage. The apparatus may comprise one or more processors, a memory coupled to at least one of the processors, and a set of computer program instructions stored in the memory and executed by at least one of the processors in order to perform actions of, generating data replication control blocks for data blocks stored in the first storage and needed to be transmitted, sorting the data replication control blocks in an ascending order of probabilities of expected overwrites of the respective data blocks, and transmitting the data blocks from the first storage to the second storage according to the sorted data replication control blocks.

Under the same inventive concept, another embodiment of the invention can provide a computer program product for data replication from a first storage to a second storage. The computer program product may comprise a computer readable storage medium having program instructions embodied therewith, the program instructions executable by a processor to cause the processor to, generate data replication control blocks for data blocks stored in the first storage and needed to be transmitted, sort the data replication control blocks in an ascending order of probabilities of expected overwrites of the respective data blocks, and transmitting the data blocks from the first storage to the second storage according to the sorted data replication control blocks.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for sorting data replication control blocks in an ascending order of probabilities of expected overwrites of respective data blocks stored in a first storage, comprising:
    creating a first queue that holds the data replication control blocks and a second queue;
    determining, in response to a write operation to a data block, a location of the data replication control block for a written data block;
    in response to determining that the data replication control block of the written data block is in the first queue:
        moving the data replication control block of the written data block to the second queue, and
        incrementing a write count of the written data block; and
    in response to determining that the data replication control block of the written data block is in the second queue:
        incrementing the write count of the written data block.

2. The method of claim 1, wherein the data replication control blocks in the first queue are sorted in an ascending order of write heats of data blocks or in an ascending order of addresses of the data blocks.

3. The method of claim 2, further comprising:
    transmitting the data blocks according to the sorting of the data replication control blocks in the first queue; and
    removing the data replication control blocks of the transmitted data blocks from the first queue.

4. The method of claim 3, wherein transmitting the data blocks further comprises:
    determining an amount of the data replication control blocks in the first queue; and
    sorting, in response that the amount of the data replication control blocks in the first queue is below a threshold, the data replication control blocks in the second queue in an ascending order of write counts of corresponding data blocks.

5. The method of claim 4, wherein transmitting the data blocks further comprises:
    converting, in response that the amount of the data replication control block in the first queue is zero, the second queue into the first queue;
    changing the write counts of the data blocks corresponding to the data replication control blocks in the converted first queue to zero; and
    creating a new second queue.

6. The method of claim 1, wherein sorting the data replication control blocks further comprises:
    creating a third queue; and
    checking, in response to the write operation to the data block, a type of the written data block;
    wherein, in response to determimining that the data replication control block of hne written data block is in the first queue and the written data block is a random data block, the data replication control block of the written data block is moved to the second queue, and the write count of the written data block is incremented;
    wherein, in response to determining that the data replication control block of the written data block is determined in the first queue and the written data block is a sequential data block, the data replication control block of the written data block is moved to the third queue;
    wherein, in response to determining that the data replication control block of the written data block is determined in the second queue and the written data block is a random data block, the write count of the written data block is incremented;
    wherein, in response to determining that the data replication control block of the written data block is in the second queue and the written data block is a sequential data block, the data replication control block of the written data block is moved to the third queue, and the write count of corresponding data block is changed to zero;
    wherein, in response to determining that the data replication control block of the written data block is in the third queue and the written data block is a random data block, the data replication control block of the written data block is moved to the second queue, and the write count of the written data block is incremented; and
    wherein, in response to determining that the data replication control block of the written data block is in the third queue and the written data block is a sequential data block, the data replication control block of the written data block is maintained in the third queue.

7. The method of claim 6, further comprising:
    transmitting data blocks according to the data replication control blocks in the third queue in a first transfer rate;
    transmitting the data blocks according to the data replication control blocks in the first queue in a second transfer rate; and
    removing the data replication control blocks of the transmitted data blocks from corresponding queues.

8. The method of claim 7, wherein the first transfer rate is higher than the second transfer rate.

9. The method according to claim 8, wherein the first and second transfer rates are determined depending on one of the followings:
    a fixed ratio between the first and second transfer rates;
    a length ratio of the first queue and the third queue; and an incoming data rate ratio of the second queue and the third queue.

10. The method of claim 6, wherein sorting the data replication control blocks further comprises:
creating a fourth queue;
wherein, in response to determining that the data replication control block of the written data block is in the fourth queue and the written data block is a random data block, the data replication control block of the written data block is moved to the second queue, and the write count of the written data block is incremented;
wherein, in response to determining that the data replication control block of the written data block is in the fourth queue and the written data block is a sequential data block, the data replication control block of the written data block is moved to the third queue.

11. The method of claim 10, wherein the data replication control block of the transmitted data block is moved to the fourth queue.

12. An apparatus, comprising:
one or more processors;
a memory coupled to at least one of the processors; and
a set of computer program instructions stored in the memory and executed by at least one of the processors in order to perform actions of to sort data replication control blocks, stored in a first storage, in an ascending order of probabilities of expected overwrites of respective data blocks:
creating a first queue that holds the data replication control blocks and a second queue;
determining, in response to a write operation to a data block, a location of the data replication control block for a written data block;
in response to determining that the data replication control block of the written data block is in the first queue:
moving the data replication control block of the written data block to the second queue, and
incrementing a write count of the written data block; and
in response to determining that the data replication control block of the written data block is in the second queue:
incrementing the write count of the written data block.

13. The apparatus of claim 12, wherein the data replication control blocks in the first queue is sorted in an ascending order of write heats of the data blocks or in an ascending order of addresses of the data blocks.

14. The apparatus of claim 13, wherein the set of computer program instructions when executed performs actions of:
transmitting the data blocks according to the sorting of the data replication control blocks in the first queue; and
removing the data replication control blocks of the transmitted data blocks from the first queue.

15. The apparatus of claim 14, wherein the set of computer program instructions when executed performs actions of:
determining an amount of the data replication control blocks in the first queue; and
sorting, in response that the amount of the data replication control blocks in the first queue is below a threshold, the data replication control blocks in the second queue in an ascending order of the write counts of corresponding data blocks.

16. The apparatus of claim 15, wherein the set of computer program instructions when executed performs actions of:

converting, in response that the amount of the data replication control block in the first queue is zero, the second queue into the first queue;
changing the write counts of the data blocks corresponding to the data replication control blocks in the converted first queue to zero; and
creating a new second queue.

17. The apparatus of claim 12, wherein the set of computer program instructions when executed performs actions of:
creating a third queue; and
checking, in response to the write operation to the data block, a type of the written data block;
wherein, in response to determining that the data replication control block of the written data block is in the first queue and the written data block is a random data block, the data replication control block of the written data block is moved to the second queue, and the write count of the written data block is incremented;
wherein, in response to determining that the data replication control block of the written data block is in the first queue and the written data block is a sequential data block, the data replication control block of the written data block is moved to the third queue;
wherein, in response to determining that the data replication control block of the written data block is in the second queue and the written data block is a random data block, the write count of the written data block is incremented;
wherein, in response to determining that the data replication control block of the written data block is in the second queue and the written data block is a sequential data block, the data replication control block of the written data block is moved to the third queue, and the write count of corresponding data block is changed to zero;
wherein, in response to determining that the data replication control block of the written data block is in the third queue and the written data block is a random data block, the data replication control block of the written data block is moved to the second queue, and the write count of the written data block is incremented; and
wherein, in response to determining that the data replication control block of the written data block is in the third queue and the written data block is a sequential data block, the data replication control block of the written data block is maintained in the third queue.

18. A computer program product, comprising a computer readable storage medium having program instructions embodied therewith, the program instructions executable by a processor to cause the processor to:
generate data replication control blocks for data blocks stored in a first storage and needed to be transmitted;
sort the data replication control blocks in an ascending order of probabilities of expected overwrites respective data blocks;
transmit the data blocks from the first storage to a second storage according to the sorted data replication control blocks
creating a first queue that holds the data replication control blocks and a second queue;
determining, in response to a write operation to a data block, a location of the data replication control block for a written data block;
in response to determining that the data replication control block of the written data block is in the first queue:

moving the data replication control block of the written data block to the second queue, and incrementing a write count of the written data block; and in response to determining that the data replication control block of the written data block is in the second queue:

incrementing the write count of the written data block.

\* \* \* \* \*